United States Patent
Hlibiciuc et al.

(10) Patent No.: US 9,356,816 B2
(45) Date of Patent: May 31, 2016

(54) REDUCING BROADCAST OF SS7 NETWORK MANAGEMENT MESSAGES BY SIGTRAN RELAY NODE

(75) Inventors: Alexandru Hlibiciuc, Aachen (DE); Bernardin Drenski, Zagreb (HR); Lukica Medak, Zagreb (HR); Robert Schnell, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 503 days.

(21) Appl. No.: 13/812,165

(22) PCT Filed: Jul. 30, 2010

(86) PCT No.: PCT/EP2010/061108
§ 371 (c)(1),
(2), (4) Date: May 14, 2013

(87) PCT Pub. No.: WO2012/013242
PCT Pub. Date: Feb. 2, 2012

(65) Prior Publication Data
US 2013/0223433 A1    Aug. 29, 2013

(51) Int. Cl.
*H04L 12/66* (2006.01)
*H04L 29/06* (2006.01)
*H04L 12/24* (2006.01)
*H04M 7/06* (2006.01)

(52) U.S. Cl.
CPC ...... *H04L 29/06503* (2013.01); *H04L 41/0226* (2013.01); *H04L 65/104* (2013.01); *H04L 65/605* (2013.01); *H04L 69/22* (2013.01); *H04M 7/066* (2013.01)

(58) Field of Classification Search
CPC .......................... H04L 29/06503; H04M 7/066
See application file for complete search history.

(56) References Cited

U.S. PATENT DOCUMENTS

| 2001/0049730 | A1 | 12/2001 | Brendes et al. |
| 2008/0192914 | A1* | 8/2008 | Lin et al. .................. 379/211.02 |
| 2008/0201427 | A1* | 8/2008 | Chen ............................. 709/204 |
| 2008/0222285 | A1* | 9/2008 | Hickey ............... H04L 41/0893 709/224 |

FOREIGN PATENT DOCUMENTS

EP    1708459 A1    10/2006

OTHER PUBLICATIONS

Morneault, K. et al, "Signaling System 7 (SS7) Message Transfer Part 3 (MTP3)—User Adaptation Layer (M3UA)", The Internet Society Network Working Group, Request for Comments: 4666, Obsoletes: 3332, Standards Track, Sep. 1, 2006, pp. 1-125, IETF, [Retrieved on Jan. 23, 2013], Retrieved from Internet: https://tools.ietf.org/html/rfc4666.

Telecommunication Standartization Sector of ITU, "Specifications of Signalling System No. 7, Signalling System No. 7—Signalling Network Structure", ITU-T Recommendation Q.705, Mar. 1, 1993, pp. 1-27, International Telecommunication Union, [Retrieved on Jan. 23, 2013], Retrieved from Internet: http://www.itu.int/rec/T-REC-Q.705-199303-1/en.

* cited by examiner

*Primary Examiner* — Huy D Vu
*Assistant Examiner* — Kevin Cunningham
(74) *Attorney, Agent, or Firm* — Coats & Bennett, PLLC

(57) ABSTRACT

The application relates to the transport of SS7 signaling over an Internet Protocol based network and in particular to the routing of SS7 Signaling Network Management SSNM Messages such as Destination Unavailable DUNA and Signalling Congestion SCON by a SIGTRAN relay node. The SSNM messages are checked against a so-called "validation rule", which either specifies a list of allowed affected point codes or a threshold rate of SSNM messages with the same affected point code. If the SSNM message is "valid" it is sent to a so-called "broadcast domain" which comprise nodes such as signaling endpoints or component of one or more application servers.

15 Claims, 4 Drawing Sheets

REDUCING BROADCAST OF SS7 NETWORK MANAGEMENT MESSAGES BY SIGTRAN RELAY NODE

TECHNICAL FIELD

The invention relates to a method of efficiently broadcasting network management messages in an IP based signaling network. Further the invention relates to a node adapted to perform a method of reducing the broadcast of network management messages.

BACKGROUND

Modern public-switched telephone networks (PSTN) use a signaling protocol, e.g. signaling system No. 7 (SS7) for switching of telephone calls. Signaling messages are transported in a signaling network separate from bearer channels. To enable the transport of SS7 signaling over an internet protocol (IP) based network, the Signaling Transport (SIGTRAN) working group of the internet engineering taskforce (IETF) has defined a set of SIGTRAN protocols. Examples of such protocols are the message transfer part 3 (MTP3) user adaptation (M3UA) protocol or the signaling connection control part (SCCP) user adaptation (SUA) protocol. An interworking between SS7 protocols and their corresponding user adaptation protocols is performed at a signaling gateway (SG), which generally terminates underlying protocol layers both on the SS7 and the IP side.

There are generally three types of signaling processes defined in SIGTRAN that can use a user adaptation protocol for a transport of signaling messages. These processes are a signaling gateway process (SGP), an application server process (ASP) and an IP server process (IPSP). For a communication between these processes, three different types of interfaces are defined: a SGP to ASP interface, an ASP to SGP interface and an IPSP to IPSP interface. These interfaces are incompatible, as e.g. only certain types of messages are allowed to be sent via a particular interface. The SIGTRAN protocols thus define interfaces which depend on the type of communication process and which are asymmetrical, i.e. for which the direction of communication matters. Details on such protocols can be found in RFC 3868 for the SUA protocol and RFC 4666 for the M3UA protocol.

To provide a communication between different types of network nodes in a SIGTRAN network architecture, SIGTRAN relay nodes are used to convert any possible interface of a SIGTRAN layer to any interface of the same SIGTRAN layer to perform interworking of SIGTRAN management procedures and to relay application messages.

FIG. 1 shows a SIGTRAN M3UA relay node comprising one or more own signaling processes of IPSP, ASP and SGP types performing mapping of parameters and messages according to the type of destination signaling process and to the local configuration in the relay node. A message sent by one of the remote signaling processes is routed by the relay node towards the remote signaling processes, in dependence on incoming message parameter values. The relay node according FIG. 1 further comprises local signaling processes. Solid black lines between the local signaling processes indicate that an interworking may be performed. For an incoming message received at local ASP, an address mapping and conversion of the message may be performed and the message may be sent to SGP via the local ASP.

A SIGTRAN network may comprise plural relay nodes. Messages may thus be routed via these plural relay nodes. In such a relay network, functions can be centralized at the relay nodes and do not need to be provided in each network node.

One of the key roles of relay nodes consists in interworking of management procedures in SIGTRAN networks, which provides for stability of signaling transport in the network. Depending on the types of supported interfaces and network management messages, the SIGTRAN signaling gateways, relay nodes and the SIGTRAN signaling endpoints (SEP) are open for processing of specified management messages that might change availability of network elements and application parts in the network. The type of the network management messages or the type of traffic maintenance messages sent is determined by the type of the remote signaling process towards which the respective message is sent. As an example, a SS7 congestion (SCON) message or a destination user part unavailable (DUPU) message may be sent to an ASP as a response to an earlier DATA message, whereas an ASP active (ASPAC) message or an ASP inactive (ASPIA) message may be sent to a SGP.

To relay or route network management messages to remote network nodes in a SIGTRAN network, the relay node has to translate a routing context by identifying an incoming routing key (RK) which is associated with the incoming management message based on a routing context (RC) parameter comprised in the incoming management message. On the basis of the incoming routing key or on the basis of the incoming routing key in combination with address-related parameters comprised in the incoming management message, an outgoing routing key is determined for the outgoing message. A routing context corresponding to the outgoing routing key is then assigned to the outgoing message. A routing key may for example identify a remote network node serving a particular traffic range and can consist of several destination point codes or can consist of destination and origination point code combination.

In situation when congestion occurs in a SS7 network in response to incoming traffic, a transfer controlled (TFC) message is generated including a destination point code (DPC) parameter as part of the MTP3 routing label. Routing of network management messages in a SS7 network is only based on the DPC parameter. If the originator of a message which triggered the TFC message is located in a SIGTRAN network, the TFC is sent to the SG node. The SG node converts the TFC message into a SCON message. The SCON message does not contain the concerned destination parameter, because, based on the RFC 4666 standard, the concerned destination parameter in a SCON message is only used if the SCON message is sent from an ASP to the SGP. Therefore, in the SG node, no mapping of the received DPC parameter from the TFC message to a concerned destination parameter of a SCON message will occur.

Another situation relates to a case wherein a remote peer MTP3-User Part at an SS7 node is unavailable. An UPU message is sent to the SG node which transfers the UPU message into a DUPU message without mapping the DPC to a concerned destination parameter.

In situations when the routing context parameter, included in a received DUPU or SCON message, does not identify uniquely a destination signaling endpoint, which is concerned about the user part unavailability or the congestion event, a SIGTRAN relay node is not able to relay the DUPU or SCON message to its destination. RFC 4666 suggests that SG nodes forward the DUPU and SCON messages to all AS's serving traffic for concerned destinations to assure that these network management messages will reach the concerned nodes. In some implementations and network scenarios with multiple signaling relay nodes, inappropriate sending of SCON and DUPU messages would lead to traffic disturbance and message multiplication at transfer of congestion information and user part unavailability information.

SUMMARY

It is an object of the present invention to improve network nodes in IP based signaling networks to enable relay of SCON and DUPU messages. This object is achieved by a method and a network node according to the independent claims. Advantageous embodiments are described in the dependent claims.

In an embodiment of the invention, a method of efficiently transferring network management messages in an IP based signaling network is proposed, wherein the network comprising a broadcast domain and wherein the broadcast domain is associated with validation rules. The method comprising the steps of checking of network management messages against the validation rules and sending of the network management message to the broadcast domain if the validation rules are in compliance with the network management message.

In a further embodiment, the network further comprises at least one additional broadcast domain and wherein the checking against the validation rules comprises selecting at least one broadcast domain. Therefore, it is possible that the network comprises several broadcast domains, wherein each broadcast domain is associated with validation rules. The associated validation rules can be different for each broadcast domain. It is possible to define such validation rules for every broadcast domain in a specific manner to limit the transfer of network management messages in the SIGTRAN network. Each of the broadcast domains contains such validation rules.

In a further embodiment the network management message comprises at least one affected point code, wherein the method further comprises an inhibiting time which is associated to the affected point code of the network management message. Every further network management message, which contains the affected point code the inhibit time is associated, is discarded within the inhibit time. The inhibit time can be a timer which is started after the first network management message with a new affected point code is transferred to a broadcast domain. This will reduce the number of network management messages in the SIGTRAN network even if the validation rules are fulfilled by every message. It is not possible to flood the network with a lot of equal messages.

The network management message is preferably a Signalling Congestion, SCON, message or a Destination User Part Unavailable, DUPU, message. These messages do not contain a concerned destination parameter and are therefore broadcasted into the network. Other network management messages which have to be broadcasted are also preferred.

In a further embodiment the method comprising the step of discarding any network management message coming from the specific broadcast domain in which the network management message has to be sent. This will reduce the amount of network management messages in the network.

In a further embodiment of the invention the value of the inhibiting timer is derived from the rate of transferred messages. This is a flexible method to increases or decreases the timer depending on the network traffic. This will reduce the amount of network management messages containing the same affected point code.

In a further embodiment the validation rules are specific for incoming messages and for outgoing messages. It is possible to use different validation rules for incoming messages and outgoing messages to reduce the internal processing of network management messages. If a network management message is discarded on the incoming side, no further processing is needed to check the message against further validation rules on the outgoing side. Incoming messages and outgoing messages apply to a node with a receiver for incoming messages and a transmitter for outgoing messages.

In a further embodiment the validation rules are specific to each network management message type. It is possible to handle different network management messages in a different way. Some of the network management messages are more or less important than other network management messages.

In a further embodiment the validation rules comprising a list of allowed originating and/or destination addresses of network management messages. In a further embodiment, the validation rules comprising a list of allowed concerned point codes of network management messages and/or comprising a list of allowed destination point codes and/or a list of allowed originating point codes of network management messages. It is therefore possible to build up a flexible list for every type of network management messages which comprise one or more of the above mentioned parameters in their routing keys.

In a further embodiment, the list is upgraded by information derived from the routing keys of transferred messages. This list can therefore be adapted to changed network environments. It is possible to derive from other messages a list of concerned destination parameters to add them to the list such that the validation rules contains a list of concerned destinations for a transferred network management message.

In a further embodiment, a network node for routing network management messages in an IP based signaling network is proposed, wherein the signaling network comprises a broadcast domain and wherein the broadcast domain is associated with validation rules. The network node comprises a receiving unit adapted to receive a network management message, a processing unit adapted to check the received network management message against the validation rules and a sending unit adapted to send the network management message to the broadcast domain if the validation rules are in compliance with the network management message.

In a further embodiment, the network further comprises at least one additional broadcast domain and wherein the processing unit is adapted to check the received network management message against the validation rules of the at least one broadcast domain and selecting at least one broadcast domain to which the network management message has to be sent.

In a further embodiment the processing unit is adapted to define an inhibit time after the network management message is sent to a broadcast domain which is associated to the affected point code of the network management message and discarding every further network management message, which discloses the affected point code the inhibit timer is associated, within the inhibit time. The inhibit time can also be a timer which can be started after a network management message with a new affected point code is processed by the processing unit.

In a further embodiment, the network node according comprises at least two interface units, each towards a remote network node of the IP based network, wherein each interface unit consists of a receiving unit and a sending unit.

In a further embodiment at least one of the remote network nodes is dedicated to a broadcast domain. In a further embodiment at least one of the remote network nodes is a signaling gateway to a SS7 network.

In a further embodiment, the network node is adapted to perform a method according to any of the prescribed embodiments.

In a further embodiment the processing unit is adapted to discard any network management message coming from the specific broadcast domain in which the network management message has to be sent.

In a further embodiment the processing unit derives the value of the inhibit time from the rate of transferred messages.

In a further embodiment, the validation rules are stored in the node and are specific for incoming messages and for outgoing messages. It is possible to use different validation rules for incoming messages and outgoing messages by the processing unit to reduce the internal processing of network management messages. If a network management message is discarded on the incoming side by the processing unit, no further processing by the processing unit is needed to check the message against further validation rules on the outgoing side. Incoming messages and outgoing messages apply to the node with a receiving unit for incoming messages and a sending unit for outgoing messages. In a further embodiment the validation rules are specific to each network management message type. It is possible to handle different network management messages in a different way in the processing unit. Some of the network management messages are more or less important than other network management messages. In a further embodiment the validation rules comprising a list of allowed originating and/or destination addresses of network management messages. This list is stored inside the node. In a further embodiment, the validation rules comprising a list of allowed concerned point codes of network management messages and/or comprising a list of allowed destination point codes and/or a list of allowed originating point codes of network management messages. It is therefore possible that the processing unit builds up a flexible list for every type of network management messages which comprise one or more of the above mentioned parameters in their routing keys. In a further embodiment, the list is upgraded by information derived by the processing unit from the routing keys of transferred messages. This list can therefore be adapted by the processing unit to changed network environments. It is possible to derive by the processing unit from other messages a list of concerned destination parameters to add them to the list such that the validation rules contains a list of concerned destinations for a transferred network management message.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
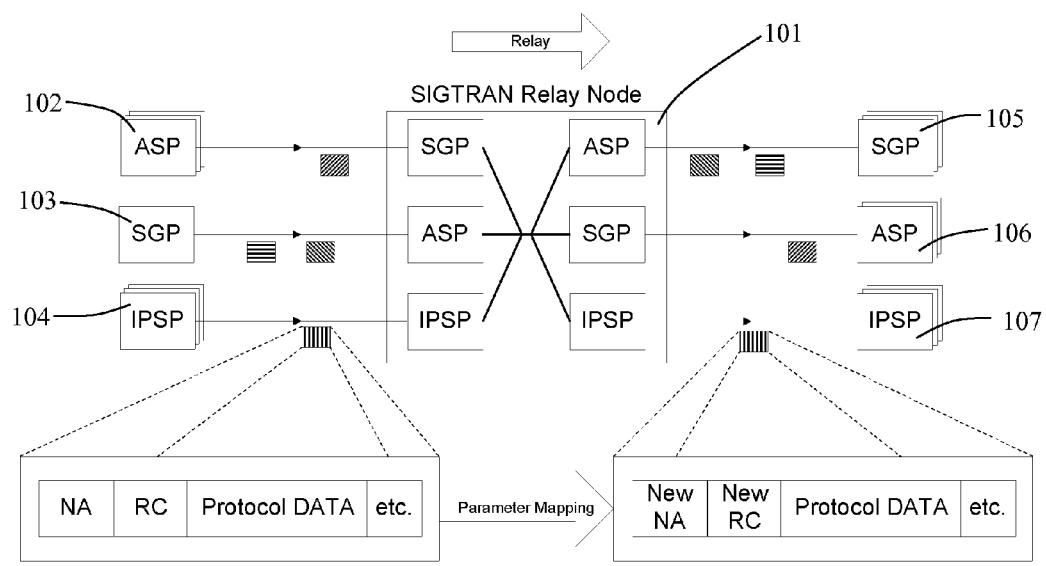
FIG. 1 shows a schematic diagram illustrating the routing of messages through a relay node of a SIGTRAN network.

FIG. 1 shows a SIGTRAN M3UA relay node 101 comprising one or more own signaling processes of IPSP, ASP and SGP types performing mapping of parameters and messages according to the type of destination signaling process and to the local configuration in the relay node. A message sent by one of the remote signaling processes 102, 103, 104 is routed by the relay node towards the remote signaling processes 105, 106, 107, in dependence on incoming message parameter values. The relay node according FIG. 1 further comprises local signaling processes. Solid black lines between the local signaling processes indicate that an interworking may be performed. For an incoming message 103, received at local ASP, an address mapping and conversion of the message may be performed and the message may be sent to SGP 105 via the local ASP.

The relay node screens among other things the network appearance parameter (NA) and the routing context data (RC) of an incoming message 102, 103, 104 to relay this message properly. The network appearance of the incoming message identifies the network context the message belongs to. In particular, it means that the network appearance uniquely identifies the corresponding M3UA network, market variant and the network indicator value. Since M3UA peers on different sides of the relay node 101 may be configured independently, sometimes the network appearance parameter of the relayed message needs to be modified to the one that the next hop signaling process expects.

The routing context of the incoming message identifies the incoming routing key that message belongs to. The incoming routing key may not contain sufficient information to perform subsequent routing, although this is possible. When the incoming routing key is not sufficient for subsequent routing, a traffic relay function of the relay node 101 can use the following parameters from the protocol data to select the outgoing routing key and the next hop signaling process, which consumes the outgoing routing key traffic: a service indicator, a network indicator, a destination point code, an originating point code and a signaling link selection code/circuit identification code or the like. At a relay of a message, e.g. a DATA message, the outgoing message may differ from the original incoming message by a new network appearance parameter and/or a new routing context.

Figure 2:
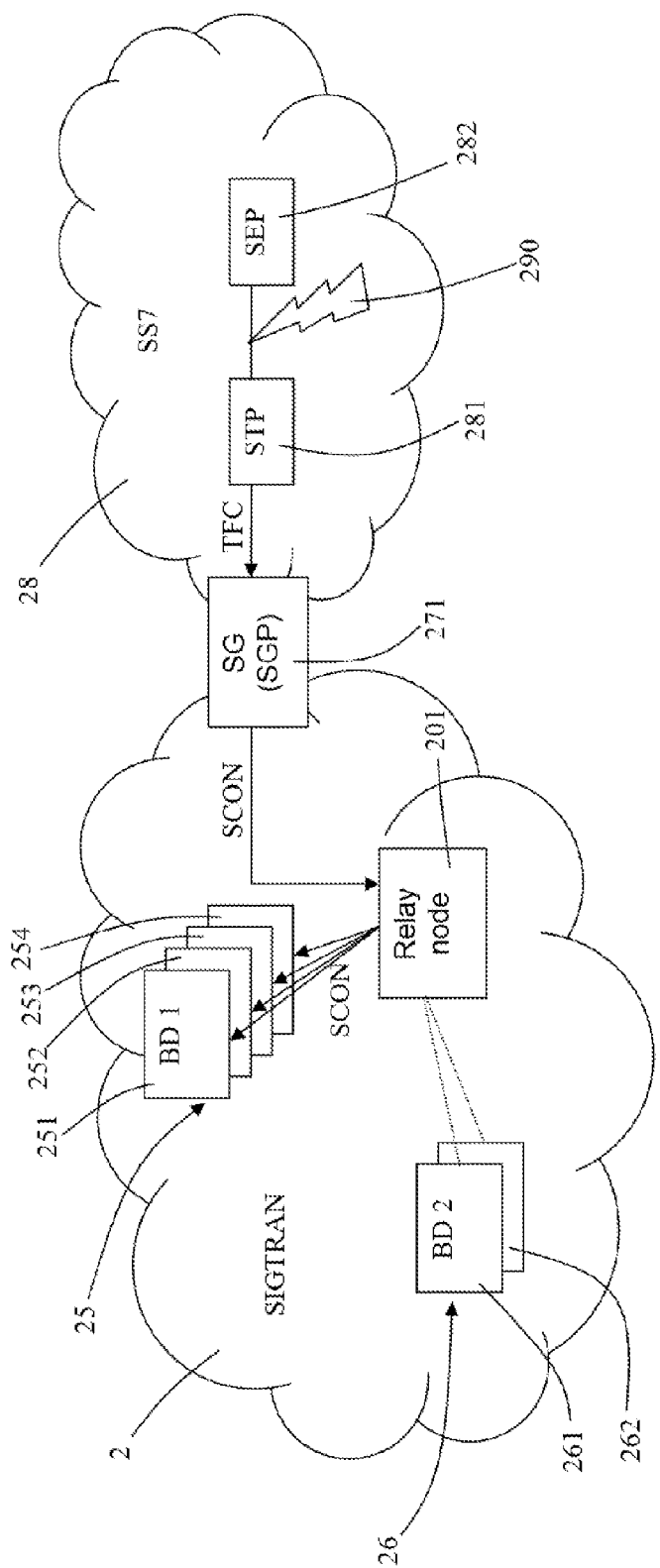
FIG. 2 shows a schematic diagram of a SS7 and a SIGTRAN network being connected by a relay node according to an embodiment of the invention.

FIG. 2 shows an embodiment of the present invention, comprising a SIGTRAN network 2 and an SS7 network 28. The SS7 network 28 comprises further at least a signaling endpoint (SEP) 282 and a signaling transfer point (STP) 281. The SEP comprises an address, known as signaling point code and can e.g. a telephone switch. The STP 281 examines the destination of messages it receives, consults a routing table and sends the message on their way using the links that are selected from the routing table. If a message, received by the STP, has to be sent to the SIGTRAN network 2, the STP 281 routes this message via an allocated signaling gateway (SG) 271 to a destination node. The SG 271 is located between the SS7 network 28 and the SIGTRAN network 2 to terminate underlying protocol layers both on the SS7 and the IP side. On the IP side of this embodiment (SIGTRAN network 2), the SG 271 is linked to a relay node 201. The relay node 201, as described before in accordance with FIG. 1, is located inside the SIGTRAN network 2. The SIGTRAN network 2 comprises two broadcast domains 25, 26. Four nodes 251, 252, 253, 254 are allocated to a first broadcast domain (BD) 25. The relay node 201 is adapted to broadcast a network management message (SSNM) to the BD 1. A broadcasted SSNM, sent to the BD 25, will be received by all nodes 251, 252, 253, 254, which are allocated to this broadcast domain 25. The relay node 201 is further adapted to receive SSNM, sent by each of the nodes 251, 252, 253, 254. A second broadcast domain 26 is linked to the relay node 201 such that the relay node 201 is adapted to send and receive SSNM to the nodes 261, 262 in this second BD 26. A broadcasted SSNM, sent to the BD 2, will be received by all nodes 261, 262, which are allocated to this broadcast domain 26. It is possible that the broadcast domains 25, 26 comprise more or less nodes. The nodes 251, 252, 253, 254, 261, 262 can also be signaling endpoints (SEP) such as mobile switching centers (MSC) or other network components of a GSM or UMTS network. The nodes 251, 252, 253, 254, 261, 262 can also be components of one or more application servers realized as a cluster of several processing nodes. The relay node 201 will only broadcast network management messages to the broadcast domains 25, 26, if the concerned destination of the SSNM is not known. DATA and traffic messages will not be broadcasted into the broadcast domains 25, 26. It is also possible that more than one relay node 201, located in a SIGRTAN network 2 is connected to one SG 271 such that every relay node 201 comprises one broadcast domain 25, 26. For redundancy reasons relay nodes 201 can be deployed as mated pairs. Mated pairs of SIGTRAN relay nodes 201 have a same configuration of SIGTRAN managed objects and connectivity to the SIGTRAN nodes. In particular, they have the same configuration of broadcast domains.

In the embodiment, depicted in FIG. 2, a node 251, 252, 253, 254 sends a message, e.g. a DATA message, to a node 282 in the SS7 network 28 via the relay node 201 and the SG 271 over the STP 281. If a congestion 290 occurs between the SEP 282 and the STP 281, a transfer controlled (TFC) message is generated by the STP 281 including the affected destination point code of the congested node 282. The TFC message has to be sent to the originating node 251, 252, 253, 254 of the DATA message to inform about the congestion 290 in the SS7 network 28. The SG 271 translates the TFC message into a SCON message without mapping the concerned destination as defined in the standard RFC 4666, paragraph 3.4.4. According to RFC 4666, the SG 271 does not use the concerned destination parameter in the SCON messages, sent to its SIGTRAN peers. According to RFC4 4666, the optional concerned destination parameter is only used if the SCON message is sent from an ASP to the SGP. In the embodiment of FIG. 2, the SCON message is sent from a SGP and therefore does not include the concerned destination parameter.

The relay node 201 receives the SCON message and performs a screening of the incoming SCON message to check if the SCON message is valid. The validation of the SCON message is performed by the relay node 201 against management objects existing in the relay node 201 such as destination point code, routes, routing keys and other SIGTRAN information elements related to the stream control transmission protocol (SCTP) associations used for receiving of messages. The screening of incoming network management messages such as SCON or DUPU messages is performed in order to prevent abuse of SIGTRAN network management messages (e.g. to avoid flooding of networks with management messages). The result of the screening of incoming network management messages will either allow further processing of the received message or will request discarding of the message including a possible indication to the management system. One of the possible setups of the screening procedure of incoming network management messages, like the SCON message according to FIG. 2, is the checking of the affected point code of the SCON message against a list of potential destinations accessible via the SCTP association on which the message has been received. This criterion will check whether the received SCON message is sent according to the principle of symmetric affected point code accessibility, that is, the relay node 201 tries to relay the SCON message only if the affected point code received in SCON is one of the point codes accessible via the association on which the SCON message was received. For instance, message screening can be based on combination of source address information and addresses affected by the management message. The screening rules can include information elements received in protocol headers on different protocol levels such as IP, SCTP and SIGTRAN protocols as well as user protocol layers. Screening of incoming network management messages, such as SCON or DUPU, may additionally limit the rate of message acceptance.

After the SCON message is screened by the relay node 201, a further screening related to the broadcast domains, the relay node 201 is connected with, can be performed. Every broadcast domain 25, 26 is associated with specified validation rules. An example of a validation rule is a list of allowed affected point codes which e.g. could include all point codes of the SS7 network 28 that communicates with the SIGTRAN network 2 via the SG 271. If the affected point codes from a SCON or DUPU message do not belong to the list of allowed affected point codes then the forwarding of network management messages into this broadcast domain will not be performed. If there is only a partial match of the affected point codes in the transferred SCON or DUPU message with the list of allowed affected point codes, then the relay node 201 as an option could screen out the affected point codes that do not belong to the list of allowed affected point codes from the transferred SSNM message to the broadcast domain. Another validation rule is the rate of broadcasted network management messages in a specified broadcast domain with the same affected point code. Should this rate violates a predefined threshold, the relay node 201 reduces the frequency or rate of broadcasting network management messages into this broadcast domain with the same affected point code.

Thus, the rate of transferred management messages, such as SCON, is adjusted according to screening rules. This can be done per node, routing key, and/or broadcast domain and is determined by the rate of transferred data messages within node, routing key, and/or broadcast domain, as well as the number of the concerned signalling processes.

If the SCON message pass the validation rules, it can be sent as a broadcast to the broadcast domain 25 and therefore to all nodes 251, 252, 253, 254. In this embodiment, the validation rules of the second broadcast domain 26 do not contain the affected point code of the SEP 282. Therefore, no broadcast of the SCON message into the second broadcast domain 26 will take place. The SIGTRAN routing keys defined between the relay node 201 and its SG node 271 in this example might not be sufficient to determine the concerned destination of a SCON message at the relay node 201. In order to solve the problem, the relay node 201 can have a means of building node-internal implicit routing keys that have finer granularity than the routing keys defined between the relay node 201 and the SG node 271. Every such implicit routing key consists of a destination point code (DPC), an originating point code (OPC), and a service indicator (SI). It is created dynamically based on the analysis of MTP3 routing label included in DATA messages exchanged on the SCTP association. The relay node 201 creates outgoing implicit routing keys by analyzing DATA messages sent from the relay node 201 to the SG node 271. Similarly, the relay node 201 creates incoming implicit routing keys by analyzing DATA messages received in the relay node 201 from the SG node 271. In general, a SIGTRAN node can subdivide every provisioned or negotiated routing key into a list of implicit routing keys based on the transferred data messages and SS7 addressing information they carry.

Each implicit routing key (RK) is related to a RK configured in the node via the routing context (RC) parameter received in the corresponding DATA message. If the RC is not used in DATA messages on an SCTP association then there is only one RK defined on the corresponding SCTP association, which comprises all traffic ranges allowed to be exchanged on the association. Thus, a set of incoming and outgoing implicit RK's can be associated with a set of the peer signalling processes that serve provisioned or dynamically negotiated RK's. Implicit RK's, their related configured RK's and the corresponding peer signalling processes can be used at definition of message validation rules. In particular, they can be used at definition of SSNM validation rules for broadcast domains. For example, each implicit routing key can have an associated inhibiting timer which will be started when a SS7 signalling network management message of a specific type, e.g. SCON or DUPU, is sent in accordance to the implicit routing key. The list of implicit RK's can also be used at processing of an incoming SSNM message for an RK in order to automatically determine the list of concerned point codes per provisioned or negotiated RK, if the message does not contain a concerned destination parameter. Another example of implicit RK use is at automatic determining of the list of allowed affected point codes per provisioned or negotiated RK at processing of an outgoing SSNM message. Such a list of allowed affected point codes includes destination point codes of incoming DATA messages received from all signalling processes registered for processing traffic of the corresponding provisioned or negotiated RK.

The relay node 201 can perform relay of SCON messages and provide rate limiting of sending SCON messages based on the number of signalling processes serving implicit routing keys. Then, the SCON messages are sent per implicit routing key, although routing context parameter is selected based on the corresponding provisioned or negotiated routing key. Under congestion conditions the number of sent SCON messages by the relay node 201 is proportional to the amount of traffic exchanged per implicit routing key. The proportion shall follow the SS7 guideline of 1 congestion indication to the signalling process originating DATA messages per 8 sent DATA messages in average.

The rate of SCON messages can also be adjusted according to the validation rules provisioned in the relay node 201 per node 251, 252, 253, 254, 261, 262, RK or broadcast domain 25, 26.

It is possible that in another embodiment the SIGTRAN network of FIG. 2 only comprises one broadcast domain 25 which comprises of nodes 251, 252, 253, 254. The other nodes 261, 262 of the SIGTRAN network in this embodiment are not part of any broadcast domain 25, 26. In this case, broadcasting of network management messages such as SCON or DUPU messages can only be performed to the nodes 251, 252, 253, 254 of the broadcast domain 25. The nodes 261, 262, which are not part of any broadcast domain in this embodiment, will never receive any DUPU or SCON message from the relay node 201.

Figure 3:
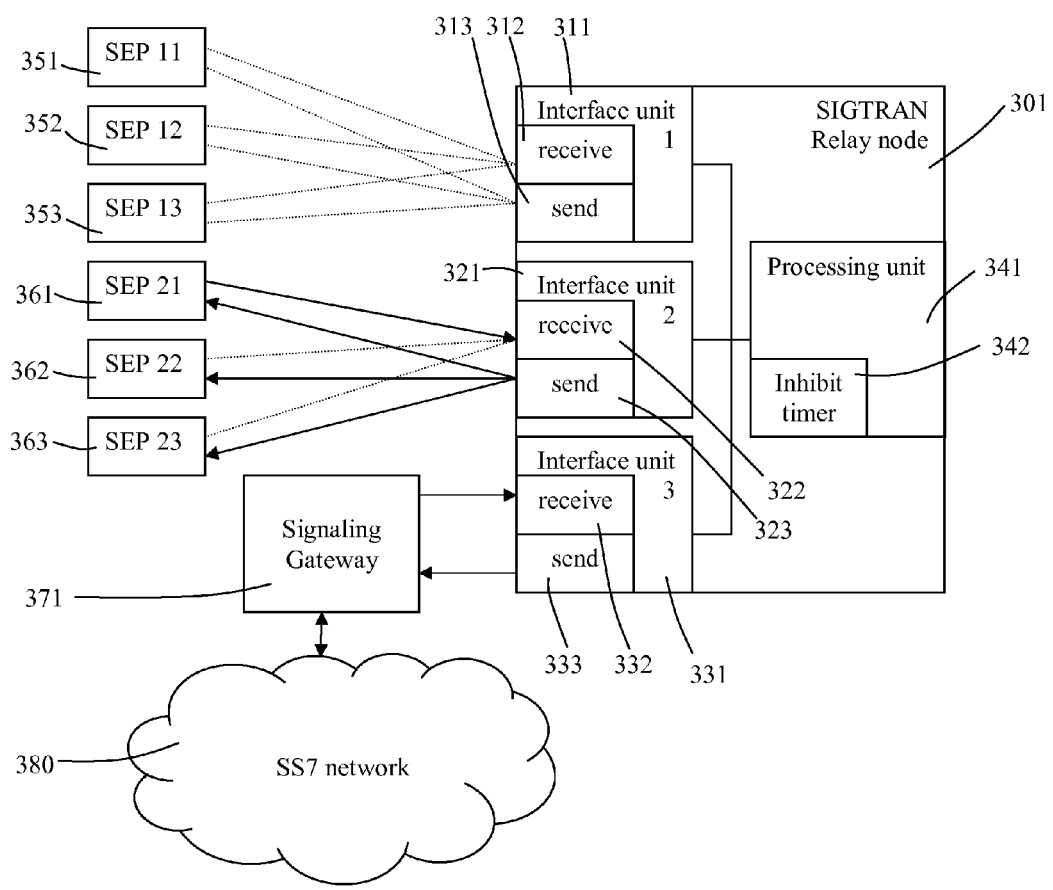
FIG. 3 shows a schematic block diagram of a relay node, illustrating functional units of the relay node being connected to remote network nodes according to an embodiment of the invention.

FIG. 3 depicts an embodiment of a configuration of a SIGTRAN relay node 301. The relay node 301 features three interface units 311, 321, 331 wherein each of them comprises a sending unit 313, 323, 333 adapted to send network management messages to remote nodes 351, 352, 353, 361, 362, 363, 371. The sending units 313, 323, 333 are further adapted to broadcast network management messages to a broadcast domain. Further the interface units 313, 323, 333 comprise a receiving unit 312, 322, 332 adapted to receive network management messages.

The SIGTRAN relay node 301 further comprises a processing unit 341 which is connected to the interface units 311, 321, 331. The processing unit 341 is adapted to receive and send messages to the interface units 311, 321, 331 and to perform screening of network management messages received by the interface units 311, 321, 331.

The interface units 311, 321 are connected to remote network nodes 351, 352, 353, 361, 362, 363. One interface unit 311 is linked to remote nodes 351, 352, 353 of a first broadcast domain. A second interface unit 321 is linked to remote nodes 361, 362, 363 of a second broadcast domain. The remote nodes 351, 352, 353, 361, 362, 363 can be named as IP-SEP's. It is possible to include more or less interface units 311, 321, 331 in a SIGTRAN relay node 301 to connect more or less broadcast domains. Several interface units can be used towards a same broadcast domain and a same SEP.

The SIGTRAN relay node 301 comprises a third interface unit 331 which is connected to a SG 371 of an SS7 network 380. The SG 371 provides for interworking of SS7 signaling endpoints with signaling nodes 351, 352, 353, 361, 362, 363 residing in the IP network. To facilitate interworking between IP nodes and SS7 SEPs the SG 371 can reassemble messages coming from the SS7 network 380 and messages coming from the IP-SEPs 351, 352, 353, 361, 362, 363.

In FIG. 3, dotted lines show the connection or link between the interface units 311, 321 and the SEPs 351, 352, 353, 361, 362, 363. Solid lines in FIG. 3 display an example of a message flow as followed: An SEP 361 of the second broadcast domain sends a DATA message to the receiving unit 322 of the allocated interface unit 321 of the SIGTRAN relay node 301. The DATA message will be routed according to the routing context and the allocated routing key to a node in the SS7 network 380. Therefore the DATA message will be send by a sending unit 333 to a SG 371. In this embodiment, a congestion in the SS7 network 380 occurs. A TFC message including an affected point code parameter and a concerned destination parameter is generated and sent to the SG 371. The SG 371 translates the TFC message into a SCON message which does not include the concerned destination parameter. After the SCON message is sent to the receiving unit 332 of the relay node 301, a screening of the incoming message takes place. After the SCON message passed the first screening of incoming messages, a further screening related to the broadcast domains takes place, as described above. In this case, the second broadcast domain including the SEPs 361, 362, 363 is selected because the DATA message was sent from this domain (SEP 21). After the sending unit 323 of the interface unit 321 broadcasted the SCON message to the SEPs 361, 362, 363, an inhibit timer 342 is started by the processing unit 341. The inhibit timer 342 can be associated with the affected point code included in the SCON message. At receiving a new SCON message, the relay node 301 will examine the affected point code and discard the message if the timer associated with the examined affected point code has not expired. A notification of the discarded SCON message can be sent to a management system to inform the operator about the discarded SCON message. If the SCON message includes an affected point code which is not associated with a timer, a new timer is started. The inhibit timer can have a default value of 1 second. The operator can change this value in relation to the network setup and the amount of traffic which is handled by the relay node 301. The advantage of this timer is the reduction of traffic of network management messages with equal affected point codes broadcasted into a broadcast domain.

Figure 4:
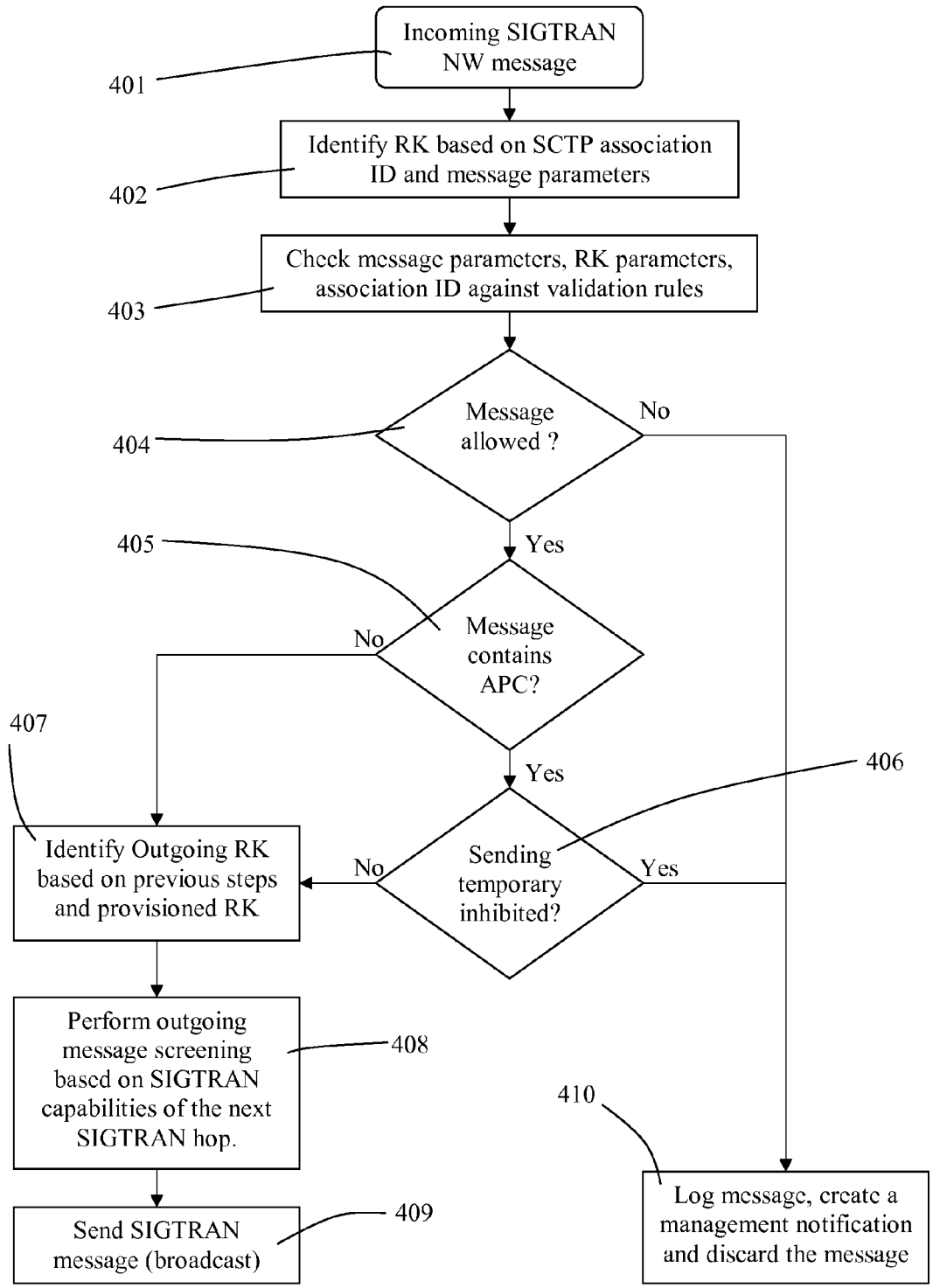
FIG. 4 shows a sequence diagram of a method flow according to an embodiment of the invention.

Obviously the network management message can also be a destination user part unavailable (DUPU) message, which also does not contain the concerned destination parameter and therefore has to be broadcasted to a domain. FIG. 4 shows a sequence diagram of a method flow according to an embodiment of the invention in a SIGTRAN relay node. After a SIGTRAN network management message, e.g. a SCON or DUPU message is received in step 401, the routing key based on the SCTP, association IDs and further message parameters are identified in step 402. At this step, if the received SSNM message does not contain a concerned destination parameter, the relay node determines the corresponding implicit RK's associated with the RK the message belongs to, and derives from them the list of concerned point codes. In step 403, the message parameters, the routing key parameters and the association ID are checked or screened against validation rules. If the message does not pass the screening rules, it will be logged and afterwards discarded in step 410. A management notification might be created.

For example, the relay node can build a list of concerned destinations for a transferred network management message so that the list consists of destinations that are part of implicit routing keys of the routing key the message is received for. The list of concerned destinations is subsequently used at screening of the transferred management message.

If the message passed the screening procedure of step 403 in step 404, it is checked in step 405 if the message contains an affected point code. If an inhibit timer is running which is associated to the checked affected point code (step 406), the message will be logged and discarded in step 410. A management notification might be created.

If no inhibit timer associated with the affected point code is active or the message does not contain an affected point code (step 405), the outgoing routing key is identified based on previous steps and provisioned routing keys in step 407. If the outgoing RK cannot be identified, the node examines whether the SSNM message can be broadcasted to the provisioned broadcast domains as part of message screening. At step 408, the node performs screening of the outgoing message based on provisioned messages screening rules, which can also include SIGTRAN capabilities of the next SIGTRAN hop. At this step, one of the validation rules is that the relay node checks the list of concerned destinations in the message against the list of allowed concerned destinations. The list of allowed concerned destinations is automatically derived from the implicit RK's for each of the registered RK's that belong to the broadcast domain. The list of concerned destinations of the message is either included in the original SSNM message or automatically derived from the implicit RK's when the message is received on the incoming side. If the lists do not overlap, the message is discarded. Similarly, the node compares the list of affected point codes of the message with the list of allowed point codes of each related RK in the broadcast domain. If the message is validated by the screening rules, it is sent to all signalling processes in SIGTRAN network that serve the identified RK's in step 409.

For example, the relay node can build a list of allowed affected destinations so that the list consists of originating addresses and does not include destination addresses from a list of implicit routing keys. The relay node can build a list of allowed affected destinations per broadcast domain, and per routing key.

Validation rules of network management messages can be specific per routing key or per broadcast domain. The validation rules for network management messages can be specific for incoming messages, and for outgoing messages.

If the network management message is sent, the relay node starts the inhibiting timer for the corresponding affected destination, e.g. point code, which could be used at screening of subsequent network management messages for a same destination.

The invention claimed is:

1. A method, in a relay node, of efficiently transferring Signaling Transport (SIGTRAN) network management messages inside an IP based SIGTRAN network, wherein the network management messages do not comprise concerned destination parameters, and wherein the network comprises a first broadcast domain which is both defined by at least one signalling endpoint and associated with validation rules, the method comprising:
   checking the network management messages against the validation rules;
   discarding any network management message coming from the specific broadcast domain in which the network management message has to be sent, wherein the network management message comprises at least one affected point code;
   sending, if the network management message is in compliance with the validation rules, the network management message to the first broadcast domain;
   defining an inhibit time associated with the affected point code of the network management message, wherein a value for the inhibit time is derived from a rate of transferred messages; and
   discarding a subsequent network management message within the inhibit time if the network management message contains the affected point code.

2. The method of claim 1:
   wherein the SIGTRAN network further comprises at least one additional broadcast domain;
   wherein the checking against the validation rules comprises selecting at least one broadcast domain.

3. The method of claim 1, wherein the network management message is a Signalling Congestion (SCON) message or a Destination User Part Unavailable (DUPU) message.

4. The method of claim 1, wherein the validation rules are specific for incoming messages and for outgoing messages.

5. The method of claim 1, wherein the validation rules are specific to a network management message type.

6. The method of claim 1, wherein the validation rules comprise a list of allowed originating and/or destination addresses of network management messages.

7. The method of claim 6, wherein the list is updated by information derived from routing keys of transferred network management messages.

8. The method of claim 1, wherein the validation rules comprise a list of allowed concerned point codes of network management messages.

9. The method of claim 1, wherein the validation rules comprise at least one of:
   a list of allowed destination point codes;
   a list of allowed originating point codes.

10. The method of claim 1, wherein the validation rules contain a list of concerned destinations for a transferred network management message.

11. A relay node, inside an IP based Signaling Transport (SIGTRAN) network, for transferring SIGTRAN network management messages in the network, wherein the network management messages do not comprise concerned destination parameters, and wherein the SIGTRAN network comprises a first broadcast domain which is both defined by at least one signalling endpoint and associated with validation rules, the network node comprising:
   a receiving circuit configured to receive the network management messages;
   a processing circuit configured to:
      check a received network management message against the validation rules;
      discard any network management message coming from the specific broadcast domain in which the network management message has to be sent, wherein the network management message comprises at least one affected point code; and
   a sending circuit configured to send the network management message to the first broadcast domain if the network management message is in compliance with the validation rules; and
   wherein the processing circuit is further configured to:
      define an inhibit time associated with the affected point code of the network management message, wherein a value for the inhibit time is derived from a rate of transferred messages; and
      discard a subsequent network management message within the inhibit time if the network management message contains the affected point code.

12. The relay node of claim 11:
   wherein the network further comprises at least one additional broadcast domain;
   wherein the processing circuit is configured to select at least one broadcast domain to which the network management message is to be sent;
   wherein the processing circuit is configured to check the received network management message against the validation rules of the selected at least one broadcast domain.

13. The relay node of claim 11:
   wherein the relay node comprises at least two interface circuits, each interface circuit associated with a remote network node of the IP based network;
   wherein each interface circuit consists of a receiving unit and a sending circuit.

14. The relay node of claim 13, wherein at least one of the remote network nodes is dedicated to a broadcast domain.

15. The relay node of claim 13, wherein at least one of the remote network nodes is a signaling gateway to a SS7 network.

* * * * *